UNITED STATES PATENT OFFICE.

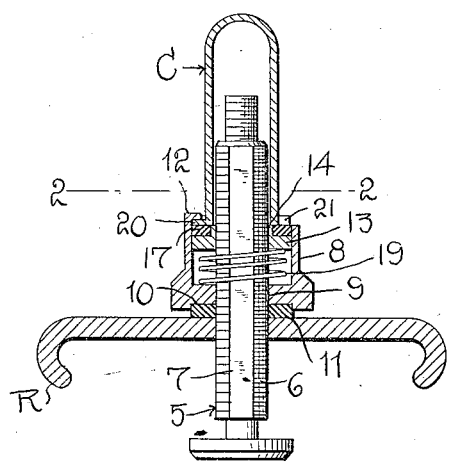
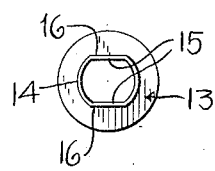
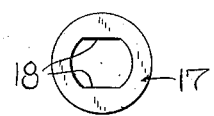
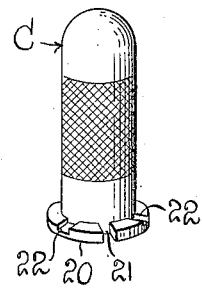
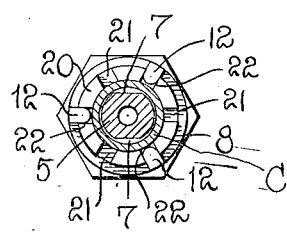

WILBUR MILLER, OF LOS ANGELES, CALIFORNIA.

TIRE-VALVE CAP.

1,223,716.

Specification of Letters Patent. Patented Apr. 24, 1917.

Application filed September 7, 1916. Serial No. 118,889.

*To all whom it may concern:*

Be it known that I, WILBUR MILLER, a citizen of the United States, residing at Los Angeles, in the county of Los Angeles and State of California, have invented certain new and useful Improvements in Tire-Valve Caps, of which the following is a specification, reference being had to the accompanying drawings.

This invention relates to an improved tire valve cap and has for its primary object to improve the construction and increase the serviceability of my prior invention shown and described in Patent No. 1,178,091, issued to me April 4, 1916.

The present invention has for one of its more particular objects to provide improved means for effecting a perfect dust and waterproof joint between the end of the cap and the nut threaded on the valve stem.

It is a further general object of the invention to provide exceedingly simple means for accomplishing the above noted object, which will materially lessen the manufacturing cost of the device, and to provide certain other detail improvements whereby the device may be applied to or removed from the valve stem with ease and facility.

With the above and other objects in view, my invention consists in the novel features of construction, combination and arrangement of parts to be hereinafter more fully described, claimed and illustrated in the accompanying drawing, in which, Figure 1 is a vertical sectional view illustrating my improved cap construction and retaining means;

Fig. 2 is a section taken on the line 2—2 of Fig. 1;

Fig. 3 is a plan view of the metal disk or washer;

Fig. 4 is a similar view of the gasket; and

Fig. 5 is a perspective view of the cap.

Referring in detail to the drawing, 5 designates the hollow stem of an ordinary inflating valve which extends through the rim R of a vehicle wheel and is connected in any approved manner with the inflatable tire mounted upon said rim. The valve stem is threaded, as indicated at 6, and is provided upon diametrically opposite sides with the longitudinally extending, flattened faces 7.

Upon the threaded valve stem 5, a nut 8 is engaged, said nut being formed upon one end with an inwardly projecting, internally threaded flange 9 for engagement with the threads of the valve stem. The space between this flange and the end face of the nut affords an annular recess or seat, indicated at 10, to receive a washer 11 of rubber, leather, or other suitable frictional material which is adapted to engage against the inner wall of the rim R. Upon the other end of the nut 8, a plurality of equidistantly spaced, inwardly projecting lugs or fingers 12 are formed.

A metal disk or washer 13 is loosely disposed within the nut 8 for longitudinal movement and is provided with a boss 14 on one face. The bore of said washer is flattened at diametrically opposite points, as shown at 15, to co-act with the flattened faces 7 of the valve stem 5 and prevent turning movement of said washer plate. The outer peripheral face of the boss 14 is also flattened at corresponding points, as indicated at 16. An annular packing gland 17 is arranged upon the washer plate 13 around the boss 14 thereof and is also provided upon its inner edge at opposite points, with the flattened faces 18 to co-act with the flattened surfaces 16 on the boss 14 and thus prevent relative turning movement of the washer and packing gland. A coil spring or other suitable expansible element indicated at 19 is arranged within the nut 8 and bears at one of its ends against the flange 9. This spring bearing at its other end against the washer plate 13 normally acts to urge the same outwardly and yieldingly hold the gland 17 in contact with the lugs or fingers 12, said fingers effectively preventing displacement and possible loss of the washer and packing gland when the device is removed from the valve stem.

C designates the elongated, cylindrical dust cap, the outer end of which is closed. Upon the inner end of this dust cap, an outwardly projecting, annular flange 20 is formed, and this flange is provided with equidistantly spaced recesses 21. Between these recesses 21, notches or seats 22 are also formed in the upper face of the flange 20.

In assembling the parts and locking the dust cap in position, it will be understood that the nut 8 is first threaded inwardly upon the valve stem to tightly engage the washer 11 against the face of the wheel rim R. The dust cap C is then inserted over the outer end of the valve stem and the flange 20 of said cap engaged upon the packing gland 17. An inward pressure is now exerted upon the dust cap to compress the spring 19 in the nut 8, it being understood that the recesses 21 in said flange are in alinement with the fingers or lugs 12. After the flange has been disposed inwardly of these fingers, a partial rotation is imparted to the dust cap so as to dispose the notches or seats 22 in the face of the flange in registering relation with the fingers. Upon the release of pressure on the dust cap, the spring 19 immediately acts to force the cap outwardly and cause the fingers to seat within said notches, thereby securely locking the dust cap against further turning movement. By constructing the washer 13 in the manner explained and providing the rubber or leather packing gland 17, a perfect dust and water-proof joint between the end of the dust cap, gland 17, and the wall of the nut 8 is maintained so that all danger of foreign material finding its way into the interior of the cap or within the chamber of the nut is obviated. The pressure of the spring 19 against the washer 13, which thereby urges the packing gland 17 constantly against the flanged end of the dust cap, eliminates all danger of the nut 8 working loose owing to the fact that the washer plate and packing gland are held against turning movement with respect to the valve stem. At the same time, however, it is to be observed that the device may be very easily and quickly detached from the valve stem with the hand or a suitable wrench, and as the nut 8 and dust cap C remain securely locked together, the possibility of loss of the parts is reduced to a minimum.

From the foregoing description, taken in connection with the accompanying drawing, it is believed that the construction, manner of use and several advantages of the invention will be clearly and fully understood. By means of the present improvements, the convenience, durability and effectiveness of my original invention is materially enhanced, and also the manufacturing cost of the original construction lessened to an appreciable extent. The nut and the dust cap may, of course, be made in various shapes and sizes and I, therefore, reserve the privilege of adopting all such legitimate changes as may be fairly embodied within the spirit and scope of the invention as claimed. For instance, the opposed faces of the boss 14 and the gasket or washer 17 may be provided with the flattened surfaces as shown, or the same can be eliminated and the boss 14 will effectually prevent lateral shifting movement of the washer disk and its contact with the threads on the valve stem. However, for the reasons above stated, namely, to prevent relative turning movement of the parts 13 and 17, I preferably provide the contacting flattened surfaces as shown.

Having thus fully described my invention, what I desire to claim and secure by Letters Patent is:—

1. The combination with a valve stem having a threaded bore, of a nut threaded upon said stem and having a chamber to surround the valve stem, a washer plate longitudinally movable within said chamber, the bore of the washer plate and said valve stem having co-acting means to prevent rotation of the washer plate, a dust cap, means for effecting a detachable locking connection between one end of the dust cap and said nut, a packing gland carried by the washer plate, and an expansible element arranged in the chamber of the nut and urging said washer plate and packing gland in one direction to hold the packing gland in tight frictional engagement against the end of the dust cap.

2. The combination with a threaded valve stem, of a nut threaded upon the stem and having a chamber surrounding the valve stem, a washer plate longitudinally movable within the chamber, the bore of the washer plate and the valve stem being provided with co-acting means to prevent rotation of the washer plate, an annular packing gland engaged upon the washer plate and movable therewith, said gland and the washer plate having co-acting means to prevent rotation of the gland relative to the washer plate, a dust cap, means for effecting a detachable interlocking connection between the dust cap and one end of said nut, and expansible means within the chamber of the nut constantly urging the washer plate and the packing gland in one direction to hold the gland in tight frictional engagement against the end of the dust cap.

3. The combination with a threaded valve stem, of a nut threaded upon said stem having a chamber surrounding the valve stem, a washer plate longitudinally movable in said chamber provided upon one face with an annular boss, the bore of the washer plate and the valve stem having co-acting means to prevent rotation of the washer plate, a packing gland seated against the face of the washer plate around said boss, said gland and the boss being also provided with coacting means to prevent rotation of the gland with respect to the washer plate, a dust cap, means for effecting a detachable interlocking connection between the dust cap and one end of the nut, and a spring arranged within the chamber of the nut and constantly urging the washer plate and the packing gland in one direction to hold the gland in tight frictional engagement against the end of the dust cap.

In testimony whereof I hereunto affix my signature in the presence of two witnesses.

WILBUR MILLER.

Witnesses:
 JOE M. TAYLOR,
 AMELIA LANG.

Copies of this patent may be obtained for five cents each, by addressing the "Commissioner of Patents, Washington, D. C."